United States Patent Office 3,832,143
Patented Aug. 27, 1974

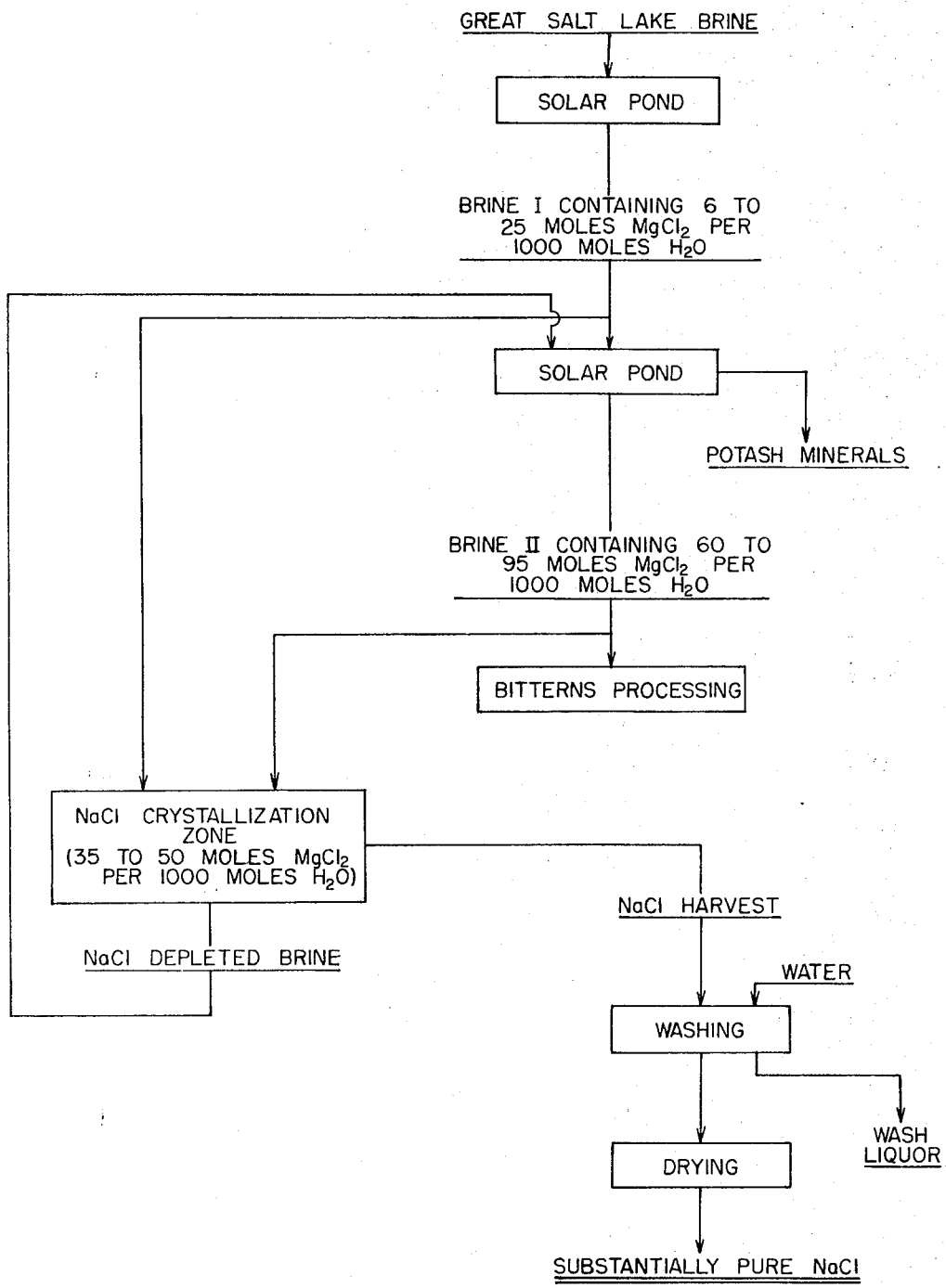

3,832,143
CRYSTALLIZATION OF SODIUM CHLORIDE
Ulrich E. G. Neitzel, Heringen (Werra), Germany, assignor to Irving Trust Company, as trustee
Continuation-in-part of application Ser. No. 735,840, June 10, 1968, now Patent No. 3,589,871, and a continuation-in-part of Ser. No. 756,071, Aug. 28, 1968, now Patent No. 3,592,615, and this application is a continuation of Ser. No. 807,573, Mar. 17, 1969, now Patent No. 3,615,259. This application June 22, 1971, Ser. No. 155,596
Int. Cl. B01d 9/02; C01d 3/06; C01f 5/30
U.S. Cl. 23—296
8 Claims

ABSTRACT OF THE DISCLOSURE

Substantially pure sodium chloride of relatively fine crystal size is crystallized by mixing two brines saturated with respect to NaCl and containing different concentrations of $MgCl_2$.

RELATED PATENT APPLICATIONS

This application is a continuation-in-part of commonly assigned, copending U.S. Patent Application Ser. No. 735,840, filed June 10, 1968, now U.S. Pat. 3,589,871. The parent application disclosed the mixing of brines to avoid the crystallization of schoenite. This application claims the production of NaCl resulting from similar mixing procedures. This application is also a continuation-in-part of commonly assigned, copending U.S. Patent Application Ser. Nos. 756,071, filed Aug. 28, 1968, now Pat. 3,592,615; and 807,573, filed Mar. 17, 1969, now 3,615,259.

BACKGROUND OF THE INVENTION

Field

This invention relates to the production of relatively fine sodium chloride. It specifically provides a technique for producing good-quality, table-grade salt which requires no crushing or recrystallization procedures.

State of the Art

Many procedures are known for the production of table salt from ores and brines. Various qualities and grades of NaCl can be produced by crushing, washing, and recrystallization procedures. Relatively fine grade, high quality NaCl is required for table salt, and the production of such material directly from brines without evaporation has not heretofore been practical.

Certain processes have been proposed for forcing NaCl from solution by the addition of reagents. U.S. Pat. No. 3,423,171, for example, suggests depressing the solubility of NaCl by the addition of organic reagents, notably alcohols. Indian Pat. 67,461 suggests mixing bitterns brine containing a high concentration of $MgCl_2$ with bitterns of lower $MgCl_2$ concentration to precipitate a mixed salt containing about equal amounts of KCl and NaCl.

Brine from the Great Salt Lake of Utah becomes saturated with respect to NaCl when it is concentrated to approximately 6 moles $MgCl_2$ per 1000 moles $H_2O$. As it is further concentrated, halite (NaCl) crystallizes first, followed by additional NaCl in admixture with double salts of potassium and magnesium. The initial halite crystal crop is relatively coarse and may be contaminated with carbonates or other impurities, making it unsuitable for direct use as table salt. The NaCl contained in admixture with other minerals in subsequent crystal crops is less readily recoverable. Simple evaporation of Great Salt Lake brines is thus productive of neither the proper crystal size nor suitable quality NaCl for table use. Other brines which are chemically similar to Great Salt Lake brines, including ocean brines, behave similarly.

SUMMARY OF THE INVENTION

According to this invention, brines similar to or derived from Great Salt Lake brines are manipulated to directly recover substantially pure NaCl of appropriate quality and grade for use as table salt. The manipulation required for this invention involves concentrating portions of the brine to two different levels with respect to $MgCl_2$, the brine at each concentration being at or near saturation with respect to NaCl. The two portions of the brine are then mixed to crystallize NaCl.

The invention is broadly applicable to brines which contain Na, Mg and Cl, although the brines generally will contain other constituents, notably K, Li, $SO_4$, $CO_3$ and minor amounts of other constituents. Exemplary brines for the practice of this invention are ocean brines and brines derived therefrom as well as brines from the Great Salt Lake of Utah and brines derived therefrom. A brine is considered as being derived from a starting brine (e.g., ocean brine or Great Salt Lake brine) when it results from physical manipulative procedures such as evaporation, cooling, heating, diluting, mixing, etc., applied to the initial brine. These physical procedures may result in altering the proportions and concentrations of constituents in the brine but do not appreciably affect the phase relationships descriptive of the brine.

The brines of most immediate interest for the practice of this invention are those which contain no more than minor amounts of dissolved constituents other than sodium, potassium, magnesium, chloride and sulfate. Simple evaporation of such brines will produce as the first crystal crop substantially pure NaCl. The aforementioned copending Patent Application Ser. No. 735,840, the disclosure of which is hereby incorporated by reference, pertains to such brines which, when evaporated at ambient temperature, become saturated with respect to schoenite before kainite. According to that invention, a brine is evaporated to beyond NaCl saturation to approximately schoenite saturation (about 20 moles $MgCl_2$ per 1000 moles $H_2O$). Brine derived from this schoenite-concentrated brine by mixing and further concentration (to above about 50 moles $MgCl_2$ per 1000 moles $H_2O$) is recycled and mixed with schoenite-concentrated brine. When the mixed brine is evaporated, substantially pure NaCl of relatively fine crystal size is crystallized before any potassium-containing species is crystallized. The present invention applies this mixing procedure to a spectrum of brines to produce similar crystal crops of table-grade NaCl.

BRIEF DESCRIPTION OF THE DRAWINGS

In the drawings, which illustrate what is presently regarded as the best mode for carrying out the invention, FIG. 2 is a flow sheet illustrating a typical embodiment of the invention.

DESCRIPTION OF THE ILLUSTRATED EMBODIMENTS

Figure 1:
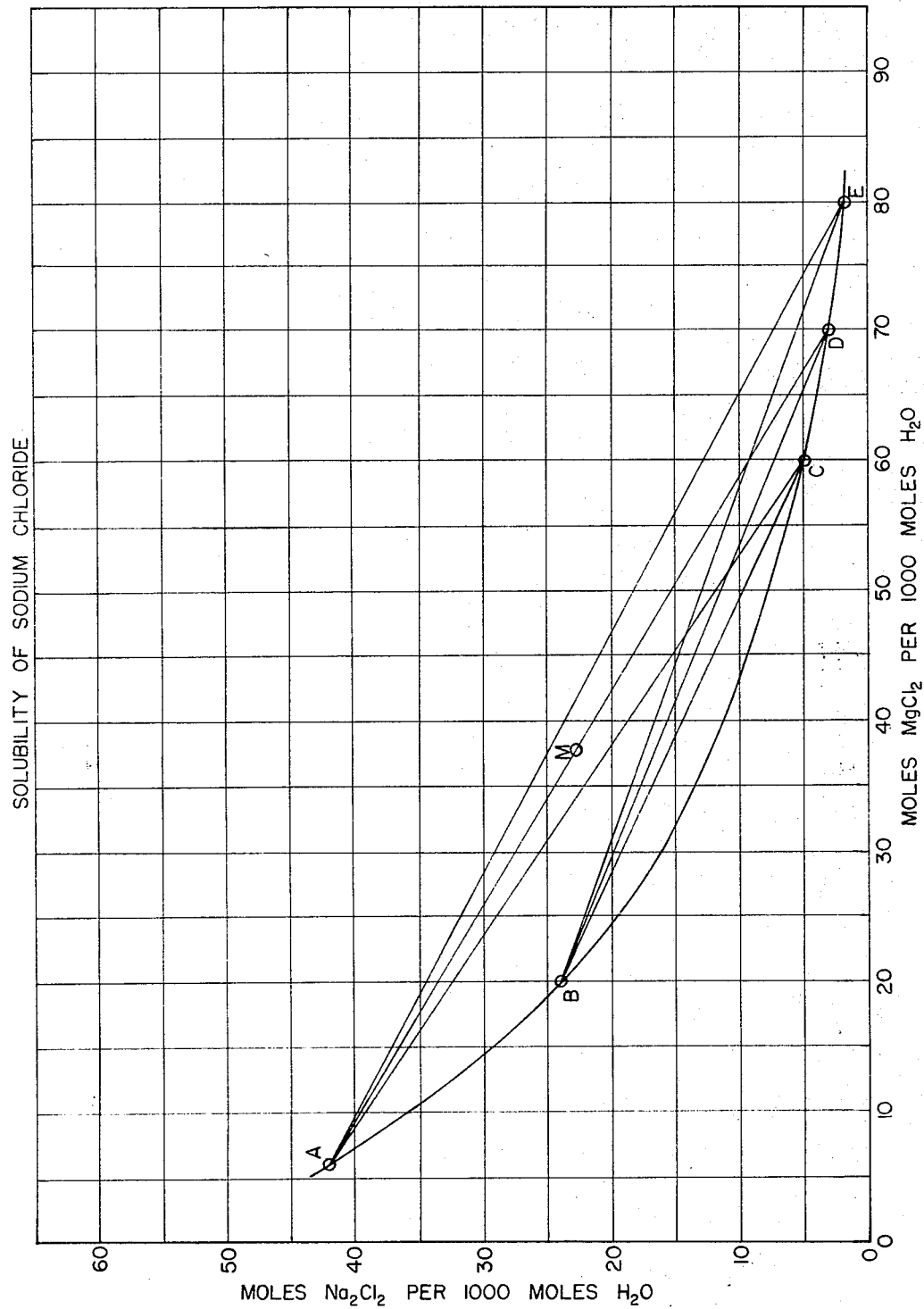
FIG. 1 is a graph plotting the saturated concentration of $Na_2Cl_2$ versus the concentration of $MgCl_2$ in a typical summer brine taken from the Great Salt Lake of Utah.

The solubility curve of FIG. 1 is typical of the brines contemplated by this invention. In the specific case of Great Salt Lake brine, the brine first becomes a saturated with $Na_2Cl_2$ at an $MgCl_2$ concentration of about 6 moles per 1000 moles $H_2O$ (represented by Point A). This brine may be mixed with any of the succeeding brines (e.g., C, D, or E) defined by the plot to produce a mixed brine having a composition defined by a point on one of the lines connecting Point A with the point representing the more concentrated brine (e.g., lines AC, AD, or AE, respectively). Similarly, a brine such as that defined by point B may be mixed with any of the brines defined by points C, D or E to produce a mixed brine with a composition defined by a point on one of the respective lines BC, BD or BE. As can be seen from the graph, any of the intermediate compositions on any of the lines AC, AD, AE, BC, BD or BE will be supersaturated with respect to $Na_2Cl_2$.

It has been found that the $Na_2Cl_2$ supersaturation of these brines is easily broken resulting in the crystallization of relatively fine NaCl. The degree of $Na_2Cl_2$ supersaturation is measured by the vertical distance between the point representing the mixed brine composition and the $Na_2Cl_2$ solubility curve. For purposes of this disclosure, NaCl crystals which pass a 35 mesh screen are regarded as "relatively fine" and a crystal crop of which half (by weight) passes a 35 mesh screen is regarded as of relatively fine grade. The quality of the crystal crop is controlled by maintaining the temperature and water content of the mixed brine at levels which avoid the formation of crystal species other than NaCl.

The solubility curves of $Na_2Cl_2$ in the $MgCl_2$ brines of this invention are defined by the general expression:

$$y = ax^2 - bx - c$$

and it can be demonstrated mathematically that the yield of the process is maximized when the value of $y$ (moles $MgCl_2$ per 1000 moles $H_2O$) in the mixed brine is the the arithmetical average of the value of $y$ when two brines are mixed as illustrated. Thus, referring to the line AD, the highest yield of NaCl is obtained when M represents the composition of a mixed brine resulting from mixing equal mole part units (the amount of brine containing 1000 moles of water) of Brine A and Brine D. Of course, it is within contemplation that more than two brines might be combined to form a mixed brine composition.

As illustrated in FIG. 2, brine from the Great Salt Lake of Utah is pumped through a solar pond system for the production of potash minerals and bitterns brine. Two brines are taken from convenient locations in the process; Brine I, containing between about 6 and about 25 moles $MgCl_2$ per 1000 moles $H_2O$; and Brine II, containing above 50, preferably between about 65 and 70, rarely above 95 moles $MgCl_2$ per 1000 moles $H_2O$; and are blended in an NaCl-crystallization zone to effect a mixed brine composition of between about 35 and about 50 moles $MgCl_2$ per 1000 moles $H_2O$. The crystallization zone may be a solar pond or a plant crystallizer. In either event, the NaCl crystal crop is recovered, washed and dried.

The invention will be better understood by reference to the following specific examples:

EXAMPLE I

One hundred fifty acre-feet of a first brine having the composition:

$5.7MgSO_4 + 6.3MgCl_2 + 2.1K_2Cl_2 + 42Na_2Cl_2 + 1000H_2O$ are mixed with 150 acre-feet of a second brine having the composition

$12MgSO_4 + 70MgCl_2 + 3.6K_2Cl_2 + 3.6Na_2Cl_2 + 1000H_2O$ in a diked pond of 1.7 acres. Ten thousand tons of NaCl are crystallized and settle in this pond with an average depth of 3 feet. The resulting brine is decanted and the salt deposit drained. The drained salt is harvested, washed with water and dried. The raw salt is of sufficient purity for human consumption and has the following approximate size distribution:

Size Distribution

| Mesh: | Weight Percent |
|---|---|
| +28 | 4 |
| −28+35 | 8 |
| −35+48 | 16 |
| −48+65 | 21 |
| −65+100 | 24 |
| −100+150 | 15 |
| −150 | 12 |

EXAMPLE II

Eight hundred gallons per minute of a first brine containing by weight 1.2 percent Mg, 2.2 percent $SO_4$, 0.7 percent K, 8.0 percent Na, 14.8 percent Cl, and 7.3 percent $H_2O$ are mixed with 800 gallons per minute of a second brine containing, by weight, 7.4 percent Mg, 4.3 percent $SO_4$, 1.0 percent K, 0.6 percent Na, 20.2 percent Cl, and 66.5 percent $H_2O$, in a reactor crystallizer holding about 24,000 gallons. The resulting slurry (with 10 tons/hr. solid NaCl) is transferred to a thickener. The slurry is filtered, and the NaCl is washed and dried. Substantially pure NaCl having a crystal size of 70 percent −35+100 mesh is recovered.

Reference herein to details of certain specific examples is not intended to limit the scope of the claims which themselves recite those features regarded as essential to the invention.

I claim:

1. A method for producing a crystal crop of substantially pure, table-grade sodium chloride which comprises:

mixing two brines substantially saturated with respect to NaCl, the first said brine being concentrated to contain between about 6 and about 25 moles $MgCl_2$ per 1000 moles $H_2O$, the second said brine being concentrated to contain above 50 moles $MgCl_2$ per 1000 moles $H_2O$, and neither of said brines containing more than minor amounts of constituents other than Mg, Na, Cl, K, Li, $SO_4$ and $CO_3$, the constituents in each of said brines being such that the first species to crystallize from solution upon evaporation is substantially pure NaCl and evidencing a solubility curve of FIG. 1 of the drawings and defined by the general algebraic expression $y = ax^2 - bx - c$ wherein $y$ represents moles $MgCl_2$ per 1000 moles $H_2O$, and $x$ represents moles $Na_2Cl_2$ per 1000 moles $H_2O$, and each of said brines further containing sufficiently low concentrations of constitutents other than Mg, Na and Cl that the solubility limit of crystal species other than NaCl is not exceeded as a result of such mixing, said brines being mixed in proportions to obtain a mixed brine composition between about 25 and 60 moles $MgCl_2$ per 1000 moles $H_2O$ thereby forming a crystal crop of table grade NaCl in contact with a mixed brine; and separating the crystal crop from the mixed brine while maintaining the temperature and water content of the brine within ranges which avoid the formation of crystal species other than table grade NaCl whereby at least 50 percent by weight of said NaCl passes through a 35 mesh screen.

2. A method according to Claim 1, wherein the first-named brine is concentrated to between about 20 and about 25 moles $MgCl_2$ per 1000 moles $H_2O$ and the second-named brine is concentrated to between about 65 and about 70 moles $MgCl_2$ per 1000 moles $H_2O$.

3. A method according to Claim 1, wherein the brines are mixed in proportions to produce a mixed brine composition containing between about 35 and about 50 moles $MgCl_2$ per 1000 moles $H_2O$.

4. A method according to Claim 1, in which the two named brines are formed by evaporating a first portion of a starting brine to at least near NaCl saturation at a first $MgCl_2$ concentration and a second portion of the same starting brine to NaCl saturation at a second $MgCl_2$ concentration.

5. A method according to Claim 4, wherein the starting brine is ocean brine or a brine derived therefrom.

6. A method according to Claim 4, wherein the starting brine is derived from the Great Salt Lake of Utah; the first-named brine to be mixed is concentrated to between about 6 to about 25 moles $MgCl_2$ per 1000 moles $H_2O$ and the second-named brine to be mixed is concentrated to above about 50 moles $MgCl_2$ per 1000 moles $H_2O$.

7. A method for producing substantially pure sodium chloride from a brine taken from the Great Salt Lake of Utah which comprises:
concentrating Great Salt Lake brine to contain between about 6 and about 25 moles of $MgCl_2$ per 1000 moles of $H_2O$ thereby to produce a first NaCl-saturated brine;
transfering said first NaCl-saturated brine to a NaCl-crystallizing zone;
mixing said first NaCl-saturated brine in said NaCl-crystallizing zone with a second NaCl-saturated brine concentrated to contain above 50 moles $MgCl_2$ per 1000 moles of water to produce a crystal crop of NaCl in contact with a NaCl-saturated, mixed brine composition containing between about 25 and about 60 moles $MgCl_2$ per 1000 moles $H_2O$;
separating said NaCl crystal crop from said mixed brine;
further concentrating said mixed brine to form the said second NaCl-saturated brine containing above about 50 moles $MgCl_2$ per 1000 moles $H_2O$; and
recycling sufficient volumes of said second NaCl-saturated brine to said NaCl-crytallization zone to maintain a selected mixed brine composition of between about 25 and about 60 moles $MgCl_2$ per 1000 moles $H_2O$ in said zone whereby table grade NaCl is substantially the only crystal species to precipitate from solution.

8. A method according to Claim 7, wherein the NaCl crystallizing zone is a solar pond and NaCl crystallization is effected at ambient temperature.

References Cited
UNITED STATES PATENTS

| | | | |
|---|---|---|---|
| 1,863,751 | 6/1932 | Kipper | 23—298 |
| 3,592,615 | 7/1971 | Neitzel | 23—298 |
| 3,615,259 | 10/1971 | Neitzel | 23—298 |
| 3,440,023 | 4/1969 | Hoppe | 23—298 |
| 1,944,548 | 1/1934 | Ebner | 23—298 |
| 3,589,871 | 6/1971 | Neitzel | 23—298 |
| 2,479,001 | 8/1949 | Burke | 23—298 X |

WILBUR L. BASCOMB, Jr., Primary Examiner

S. J. EMERY, Assistant Examiner

U.S. Cl. X.R.

23—298, 300, 303, 304